Figure 1:
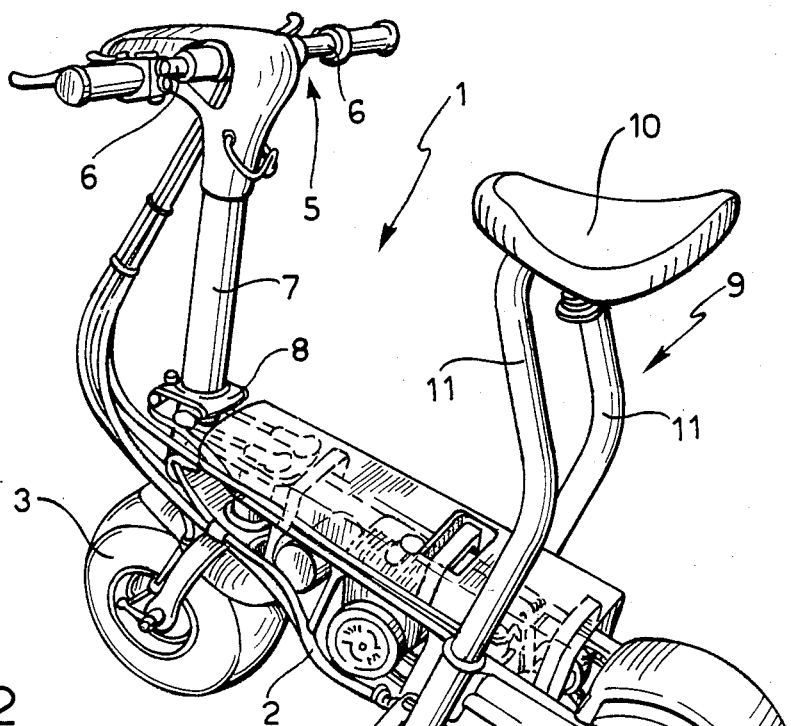

United States Patent [19]

Grattapaglia

[11] Patent Number: 4,732,403
[45] Date of Patent: Mar. 22, 1988

[54] FOLDING MOPED WITH A COLLAPSIBLE SUPPORT FOR THE SADDLE

[75] Inventor: Renzo Grattapaglia, San Carlo Canavese, Italy

[73] Assignee: ALGAT S.p.A., Turin, Italy

[21] Appl. No.: 3,339

[22] Filed: Jan. 14, 1987

[30] Foreign Application Priority Data

Jan. 14, 1986 [IT] Italy ............................ 52855/86[U]

[51] Int. Cl.⁴ .................................................. B62K 15/00
[52] U.S. Cl. ............................ 280/278; 74/551.3; 280/287; 280/291; 403/100
[58] Field of Search ............... 180/219; 280/274, 278, 280/291, 281 R, 287, 7.1, 87.04 R, 639, 515; 74/551.3, 551.4; 403/100, 102

[56] References Cited

U.S. PATENT DOCUMENTS

| 2,665,144 | 1/1954 | Birdwell | 280/515 |
| 3,863,521 | 2/1975 | Gatsos | 280/278 |
| 4,243,342 | 1/1981 | Marto | 280/515 |
| 4,417,745 | 11/1983 | Shomo | 280/287 |
| 4,611,818 | 9/1986 | Cammarata | 280/278 |
| 4,611,945 | 9/1986 | Diego | 403/102 |
| 4,634,138 | 1/1987 | Fryer | 280/287 |

FOREIGN PATENT DOCUMENTS 1354148  1/1964  France ............................... 280/278

Primary Examiner—John J. Love
Assistant Examiner—Everett G. Diederiks, Jr.
Attorney, Agent, or Firm—Sughrue, Mion, Zinn, Macpeak & Seas

[57] ABSTRACT

A folding moped has a collapsible support for the saddle constituted by two parallel pillars with lower jointed end portions which are inserted within two hollow parts fixed to the frame for sliding between an inserted position in which the pillars are held in an erect condition and a withdrawn position in which the joints project above the respective hollow parts to allow the pillars to be collapsed forwardly.

2 Claims, 4 Drawing Figures

U.S. Patent  Mar. 22, 1988  Sheet 1 of 2  4,732,403

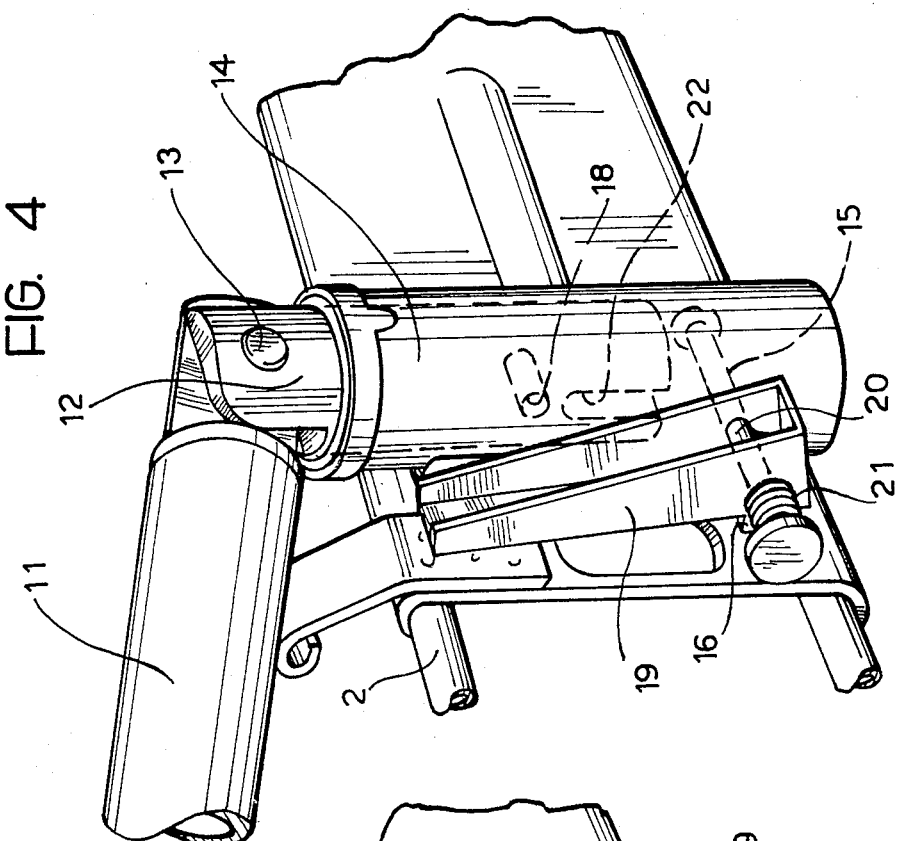
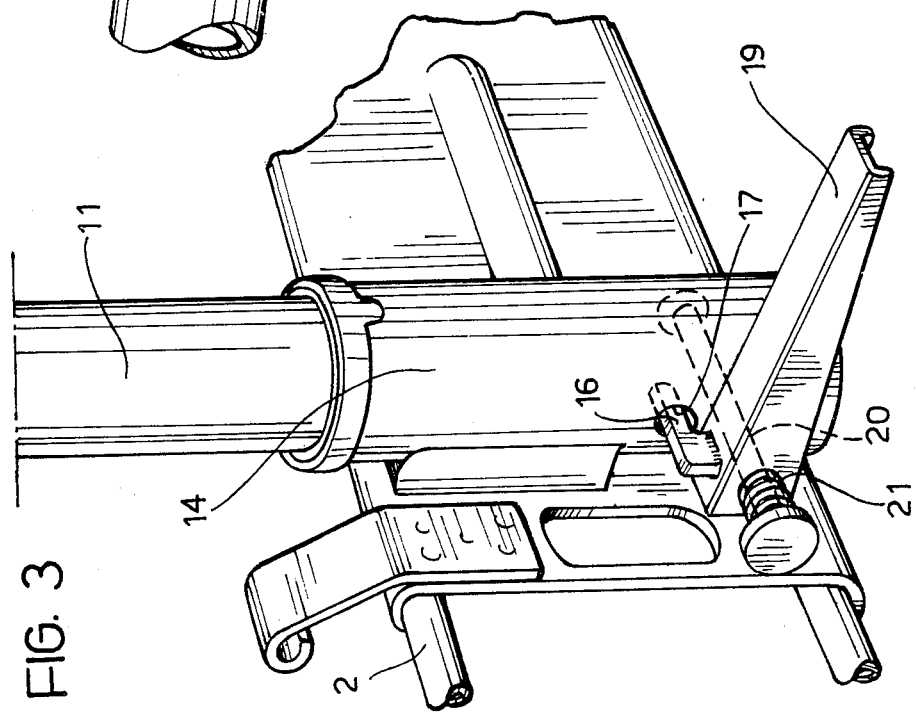

FOLDING MOPED WITH A COLLAPSIBLE SUPPORT FOR THE SADDLE

The present invention relates to folding mopeds in general.

More particularly, the invention relates to a folding moped of the type including a frame, handlebars with foldable arms carried by a rearwardly-collapsible steering column, and a saddle support constituted by two spaced-apart pillars articulated to the frame so as to be pivotable between an erect condition of use and a collapsed rest condition in which these pillars extend substantially horizontally and forwardly.

The object of the present invention is to provide a moped of the type defined above, in which the pivoting of the saddle support between the erect condition and the rest condition and vice versa can be achieved by simple, strong and cheap means so as to render this operation easier, more convenient and practical for the user.

In order to achieve this object, the present invention provides a folding moped of the type defined at the beginning, characterised in that each pillar includes a lower hollow part rigidly fixed to the frame in a position corresponding to the erect condition of the support, and an upper part which is movable relative to the lower hollow part and has a jointed end portion inserted in the lower hollow part for sliding between an inserted position, in which the joint is inserted in the lower hollow part and the upper part of the pillar is held erect, and a withdrawn position in which the joint projects above the lower hollow part to allow the upper part of the pillar pivotally to collapse.

Preferably, each pillar has an associated disengageable stop for retaining the respective jointed end portion within the corresponding lower hollow part in its inserted position. This stop is conveniently constituted by an appendage carried by a pivotable foot-rest which can be inserted, under the action of a thrust spring, through corresponding lateral holes formed in the lower hollow part and in the jointed end portion.

Figure 2:
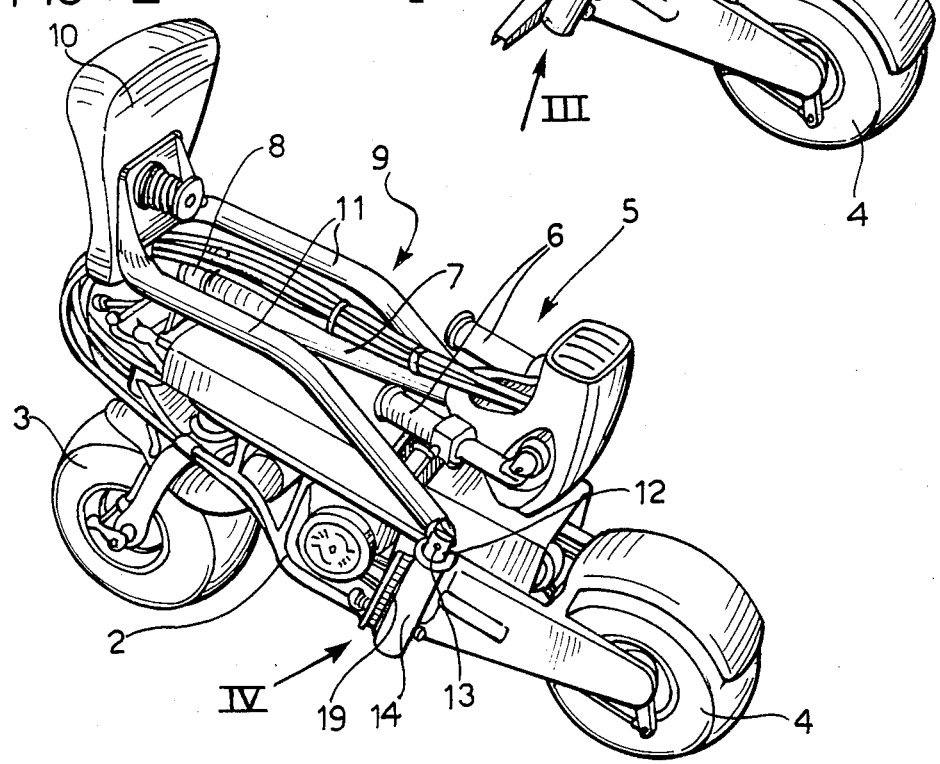

The invention will now be described in detail with reference to the appended drawings, provided purely by way of non-limiting example, in which:

FIG. 1 is a diagrammatic perspective view of a folding moped according to the invention, illustrated in its condition of use, FIG. 2 is a view similar to FIG. 1 with the moped folded, FIG. 3 is a perspective view on an enlarged scale, taken on the arrow III of FIG. 1, and FIG. 4 is a view similar to FIG. 3, taken on the arrow IV of FIG. 2.

With reference initially to FIGS. 1 and 2, a folding moped is generally indicated 1 and includes a frame, generally indicated 2, supporting a front steering wheel 3 and a rear driven wheel 4.

The steering of the front wheel 3 is controlled through handlebars 5 formed by a pair of collapsible arms 6 supported at the top of a steering column 7 connected to the frame 2 by a lockable hinge 8. The steering column 7 can be collapsed rearwardly into the position shown in FIG. 2, after the folding of the arms 6 and the unlocking of the hinge 8.

A support, generally indicated 9, which is also collapsible, carries a saddle 10 at its top.

The support 9 is constituted by two spaced-apart pillars 11 each of which has a lower end portion 12 (FIGS. 2 and 4) jointed about a transverse articulated pin 13.

The two end portions 12 are slidably inserted in respective hollow members 14 fixed to the opposite sides of the frame 2.

The structure described above enables the support 9 to pivot between the erect condition of use illustrated in FIGS. 1 and 3 and the collapsed rest condition illustrated in FIGS. 2 and 4. In its erect condition, the end portions 12 with the joints 13 are inserted within the respective hollow members 14 whereby the two pillars 11 are held in a raised position. As illustrated in greater detail in FIG. 4, a transverse stop 15 is inserted in the lower region of each hollow member 14 and supports the corresponding jointed portion 12 in the erect condition of the pillars 11. Furthermore, in order to ensure firm and secure locking of the support 9 in this position, each pillar 11 has an associated disengageable locking appendage 16 for passing through a lateral hole 17 in the hollow member 14 and a corresponding lateral hole 18 (FIG. 4) in the portion 12, in the erect condition. The two locking appendages 16 are conveniently carried by two foot-rests 19 rotatably supported on respective extensions 20 of the stop pins 15 so as to be pivotable between a raised inoperative position (FIG. 4) and a lowered position of use (FIG. 3). In the lowered position of use, the locking appendages 16 engage the holes 17 and 18 under the action of respective thrust springs 21 surrounding he appendages 20 of the stop pins 15.

In order to ensure easy, automatic insertion of the locking appendages 16 by snap-coupling, the bases of the jointed portions 12 conveniently have respective recesses 22 arranged to engage the stops 15 with form-coupling during the positioning of the support 9 in the erect position.

In order to change from the erect condition of the support 9 to the collapsed condition, it suffices to draw the pillars 11 upwardly by means of the saddle 10 until the joints 13 are withdrawn from the hollow members 14 to allow the collapse of the pillars 11 relative to the portions 12. Clearly, stop members (not shown in the drawings) are provided for preventing the complete withdrawal of the portions 12 from the hollow members 14.

It will be clear from the above that the lowering and raising of the support 9 can be carried out extremely conveniently and easily with a minimum of physical effort, and the structure described above, which is arranged to allow these operations, is particularly simple, compact and strong.

What is claimed is:

1. A folding moped including a frame, a steering column which can be collapsed rearwardly, handlebars with folding arms carried by the steering column, a pair of footrests pivotally mounted on said frame and a saddle support constituted by two spaced-apart pillars connected to the frame with said pillars being pivotable between an erect condition of use and a collapsed rest condition in which these pillars extend substantially horizontally and forwardly, wherein each pillar of the support includes a lower hollow part rigidly fixed to the frame in a position corresponding to the erect condition of the support, and an upper part which is movable relative to the lower hollow part and has a jointed end portion inserted in the lower hollow part for sliding between an inserted position, in which the joint is inserted in the lower hollow part and the upper part of the pillar is held erect, and a withdrawn position in which the joint projects above the lower hollow part to allow the upper part of the pillar pivotally to collapse, wherein a respective disengageable locking member is associated with each pillar for retaining the respective jointed end portion within the corresponding lower hollow part in the inserted position, said locking members being formed by appendages on said footrests and corresponding lateral holes are formed in the lower hollow parts and in the jointed end portions of the two pillars, the appendages being insertable into the holes under the action of respective thrust springs and, wherein said footrests are pivotable about a pair of pins between a lowered position of use and a raised rest position, said pins passing transversely through the lower hollow parts to act as lower stops for supporting the jointed end portions of the two pillars.

2. A moped according to claim 1, wherein the jointed end portions of the two pillars define respective lower centering recesses for engaging the pins in the inserted position.

* * * * *